April 20, 1954   R. G. LE TOURNEAU   2,675,927
REVOLVING CRANE
Filed Dec. 13, 1949   3 Sheets-Sheet 1
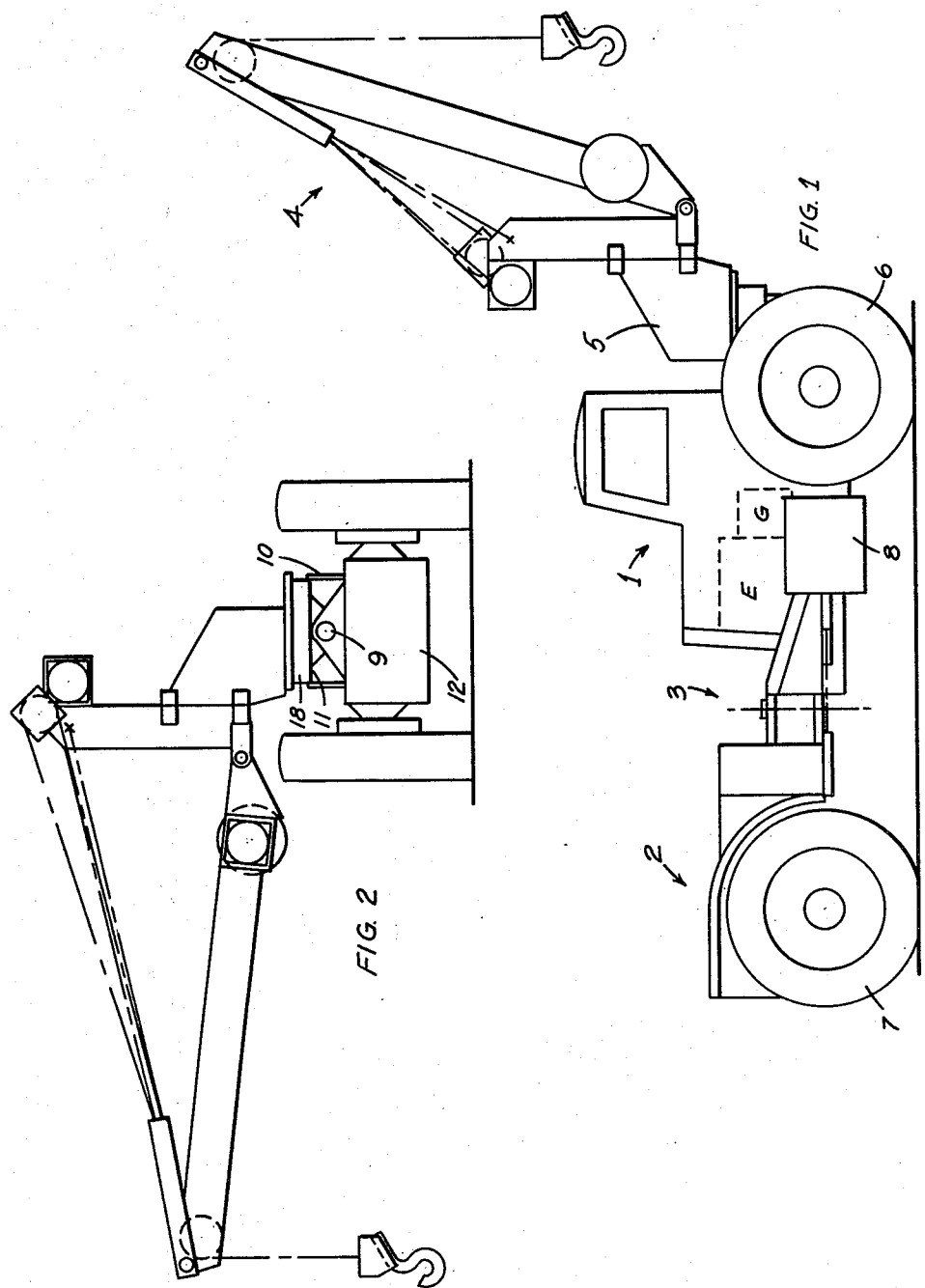
INVENTOR.
R. G. LeTOURNEAU
BY
F. D. Copeland Jr.
AGENT

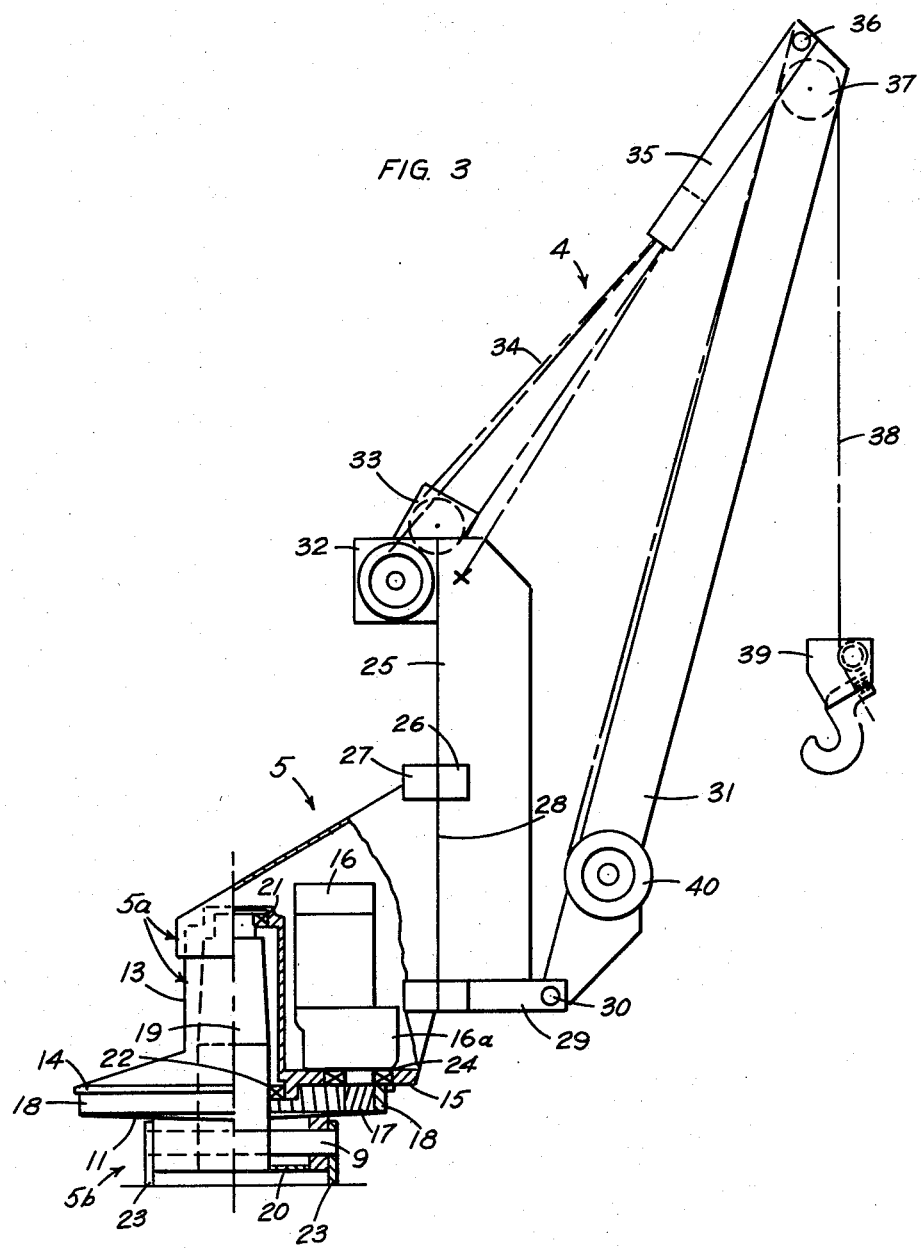

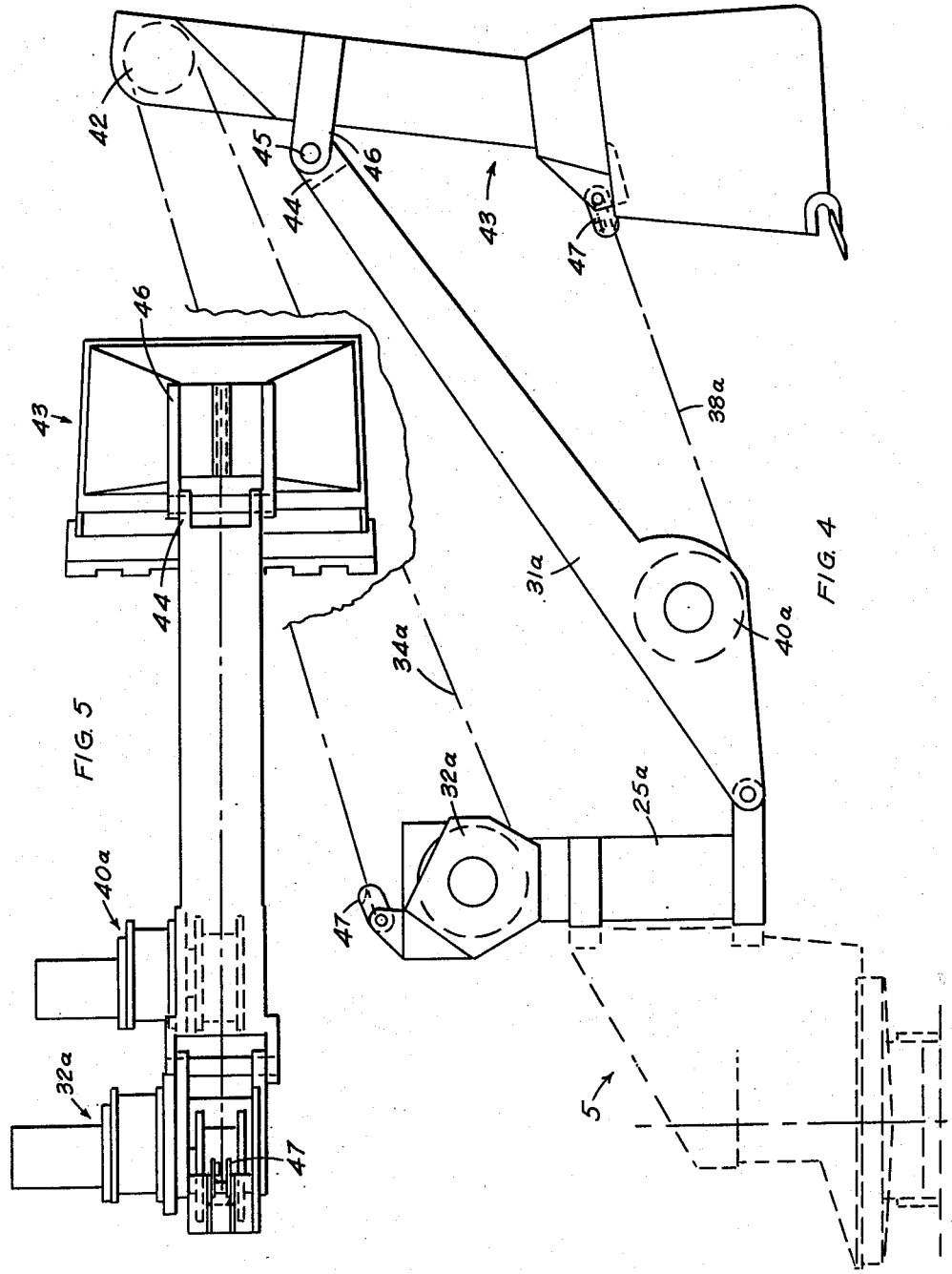

Patented Apr. 20, 1954

2,675,927

UNITED STATES PATENT OFFICE 2,675,927

REVOLVING CRANE

Robert G. Le Tourneau, Longview, Tex., assignor to R. G. Le Tourneau, Inc., Peoria, Ill., a corporation of California Application December 13, 1949, Serial No. 132,660

7 Claims. (Cl. 212—59)

This invention relates to construction machines such as cranes, shovels and the like, and has for its primary object to provide a novel machine of this type which is a composite vehicle made up of a standard two wheel tractor and certain special attachments.

Another object is to provide a mobile crane comprising a two wheel truck, a two wheel tractor pivotally connected to the truck for steering about a vertical axis thereof, a boom assembly, and a power rotated hitch connecting the boom assembly for rotation about a vertical axis of the tractor.

Another object of this invention is to provide a structure whereby the steering hitch of a two wheel tractor may be utilized to revolve a crane boom or similar tool.

A further object is to provide a vehicle which includes means within the wheel base whereby counterweight may be readily added or removed.

A still further object is to provide a crane which is relatively long in a forward direction for counterbalancing a heavy load behind the rear wheels, yet which has an extremely small amount of side overhang so that it is capable of operating with 180° revolution in tight places such as between railway cars.

Yet another object is to provide a construction tool and vehicle in which the functions of the tool including revolving, and steering of the vehicle are all performed electrically by equivalent sized electric motors. This will reduce the number of spare parts required and simplify maintenance.

In the drawings:

Fig. 1 is a side elevation of the composite machine being used with a crane attachment.

Fig. 2 is an end view of the machine in Fig. 1 showing the crane boom at right angles to the line of travel.

Fig. 3 is a side elevational view, partially in section, of the power hitch and crane attachment.

Fig. 4 is a side elevational view of the parts required to convert this machine for use as a trench hoe.

Fig. 5 is a top plan view of the trench hoe of Fig. 4.

Referring now to the drawing, in Fig. 1 it will be observed that the complete machine when used as a semi-revolving crane consists in general of a two wheel tractor 1, a two wheel steering truck 2 pivotally connected thru a steering mechanism 3 to the forward end of the tractor, and a crane attachment 4 mounted at the rear of the tractor.

The tractor 1 includes a conventional power plant E projecting forwardly of its drive wheels, and attaching directly to in-line generator G.

Details of the steering mechanism 3 of this machine may be observed by reference to copending application 99,442 filed June 16, 1949, and now abandoned in which a two wheel tractor is steered by a similar arrangement. The basic tractor similar to the one shown in the instant application is described in granted Patent 2,454,070 dated November 16, 1948.

The instant invention utilizes the normal power steering hitch 5 of the tractor 1 to support and revolve various tools such as crane attachment 4. When used as a crane it may be desirable to employ counterweight between the tractor drive wheels 6 and the steering truck wheels 7. To accomplish this, sand boxes 8 are attached to main frame of the tractor 1. These boxes, in addition to wet sand, may contain weights, scrap iron and the like, and being located within the wheel base give traction to the drive wheels and stability to the complete machine.

Since power hitch 5 was normally used for steering between tractor 1 and a trailing unit attached to the hitch, it was pivoted to the tractor by longitudinal pin 9 to permit relative lateral tilting between the tractor and a trailing unit. In the present embodiment, however, such tilting is undesirable and to prevent this, rigid brackets 10 have been installed between the non-revolving case 13 of the power hitch and the main frame 12 of the tractor.

Details of the power hitch may be seen with reference to Fig. 3. The hitch 5 comprises: an upper revolving group 5a which includes the external case 13 down to sealing ring 14 and includes internally a mount structure 15 for electric motor unit 16, the latter including a reduction gear box 16a and pinion 17; and a lower non-revolving group 5b which includes a combined internal ring gear and case 18, and a vertically upstanding kingpin 19 which is rigidly attached to bottom plate 11 and tubular housing 20, and is journalled at 21 and 22 to permit relative rotation of the housing of the upper revolving group 5a thereabout. A tube 20 surrounds trunnion pin 9 which is supported by ears 23 of the tractor main frame 12. Pinion 17 of electric motor unit 16 is journaled in structure 15 as at 24 and engages the internal teeth of ring gear 18 and when electrically operated causes the entire revolving group 5a together with crane attachment 4 to revolve about the vertical axis of kingpin 19. This performance is the reverse of the power hitch when used for steering, since in the steering operation the upper group (5a) would be attached to a trailing unit which would remain stationary due to its great resistance to turning, and the lower group (5b), and its attached two wheel tractor, would turn. Here, however, due to the addition of the front wheels and the fact that the crane attachment is unsupported from the ground, the bulk of the turning resistance lies with the tractor and as a result the crane attachment 4 does the revolving.

The crane attachment itself comprises a hitch post 25 equipped with mounting blocks 26 which are aligned with bolt blocks 27 surrounding a vertical mounting plate 28 of power hitch 5 for attachment therewith by capscrews (not shown). Lugs 29 project rearwardly from the bottom of hitch post 26 to receive pin 30 about which boom 31 pivots. The upper end of post 26 supports an electric winch 32 and a sheave 33. Cable 34 from this winch is directed thru a pair of sheaves contained in floating sheave housing 35 which is pivoted by pin 36 to the upper end of boom 31. Also included at the upper end and within the boom is sheave 37 around which another cable 38 is reeved when passing from hoist block 39 to its electric winch 40.

Referring to Figs. 4 and 5, it will be seen that the crane attachment may be replaced simply and easily by a trench hoe attachment 41 which change is accomplished by re-reeving the cable, now 34a to encircle sheave 42 at the upper end of bucket structure 43; and replacing boom 31 with new boom 31a with ears 44 at its upper end to retain pin 45 for pivotal engagement thereof with eye plates 46 of bucket structure 43. It will be recognized that, if desired, crane boom 31 can be modified to equal boom 31a, and a replacement boom will not be necessary. Likewise hitch post 25a may be a modification of hitch post 25, or the crane hitch post may be used without modification if desired. Power winch 40a of boom 31a is directly cable connected to the bucket 43 by pivoted cable anchor 47. This cable is represented at 38a.

Raising and lowering of the trench hoe boom is accomplished in a similar manner as the crane boom; i. e., reeling in of cable 34a by winch 32a. However, in order for the boom 31a to raise (or lower), it is necessary to brake winch 40a, otherwise the bucket structure 43 will swing about its pivot pin 45 as it does when swinging out to take a new "bite" in digging operations. When the digging action begins, winch 40a reels in cable 38a and at the same time winch 32a pays out cable 34a.

From the foregoing description, it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described by invention, the following is claimed as new and useful, and upon which Letters Patent is desired:

1. In combination, a two wheel tractor, a two wheel truck ahead of the tractor and connected thereto in steerable relation, a power hitch at the rear of the tractor, means for imparting rotation to the power hitch, a boom assembly attached to said hitch for rotation therewith, said boom assembly comprising an upstanding hitch post, a boom arm pivoted to said post, and vertically aligned bolt blocks on said hitch post for matching engagement with a vertical mounting plate of said power hitch to cause rotation of the entire boom assembly with rotation of said power hitch.

2. A combination as set forth in claim 1, in which the boom arm of said assembly is pivoted to the lower end of said hitch post and control means are associated with the upper end of said post for controlling the reach of said boom arm; said control means being an electric winch unit mounted at the upper end of the hitch post, a cable control system connecting the winch and a sheave housing pivoted to the upper end of said boom arm; a separate electric winch unit mounted on said arm and controlling a hook hoisting cable system.

3. In combination, a two wheel tractor, balancing means ahead of the tractor and connected thereto in steerable relation, a power hitch on the tractor at the rear thereof, means for rotating the power hitch, a boom assembly attached to said power hitch for rotation therewith, said power hitch including a rearward facing vertical mounting plate and spaced bolt blocks, said boom assembly comprising: an upstanding rectangular hitch post, bolt blocks adjacent that side of said hitch post corresponding to said vertical mounting plate and aligned with said first named bolt blocks; a boom arm pivoted to said post at the lower end thereof, an electric winch mounted on said arm, a tool associated with the outer end of said boom, a cable powered by said winch and operatively connected with said tool; a sheave block pivoted to the outer end of said boom; a second electric winch attached to the upper end of said post, and a cable connecting said second winch and said sheave block in operative relation.

4. In combination, a two wheel tractor, a balancing unit ahead of the tractor and connected thereto in steerable relation, a power hitch on the tractor at the rear thereof, and a boom assembly attached thereto for relative rotation therewith; said power hitch comprising: a housing rotatable with respect to the tractor and having an electric motor therein, an internal ring gear fixed on the tractor, a vertical kingpin upstanding from said tractor and journalled in said housing; said electric motor including a downwardly projecting pinion, said pinion engaging the internal teeth of said ring gear in driving relation.

5. In combination, a two wheel tractor including a main case, an engine, drive wheels supporting the tractor, a generator on said tractor driven by said engine, an upstanding hitch at the rear of said tractor adjacent said drive wheels, said hitch comprising an upper revolving group and a lower stationary group, an internal ring gear integral with said lower group, an electric motor fixed relative to said upper group; a drive pinion on said motor, said pinion being in mesh with and driving said ring gear, a vertical mounting plate of said upper group including bolt blocks, a hitch post including bolt blocks attached to said mounting plate, a boom pivoted to the lower end of said post, a sheave at the free end of said boom, said motor and winches receiving operating power from said generator, a sheave at the upper end of said post, a winch on said post, and a second winch on said boom, a floating sheave housing pivoted to the upper end of said boom, a cable connected between said post winch and said housing and said post sheave in operative relation, a second cable passing from said boom winch over said boom sheave and beyond, and a hook attached to the free end of said last named cable.

6. A combination as in claim 5, in which said lower group includes a vertical kingpin supported from the tractor main frame, said ring gear surrounding the kingpin, a bottom plate attached to said ring gear, said upper group including a housing covering the top of said ring gear, a sealing ring surrounding said ring gear at the top and adjacent the juncture between said ring gear and said housing.

7. A mobile crane comprising a two wheel truck, a two wheel tractor pivotally connected to the truck for steering about a vertical axis of the truck, a boom assembly, and a power rotated hitch connecting the boom assembly for rotation about a vertical axis of the tractor, said power rotated hitch comprising an internal ring gear fixed on the tractor, a kingpin on the tractor, a housing journalled for rotation about the kingpin, and a motor driven pinion journalled in the housing and meshing with said ring gear, said boom assembly being connected to said housing.

References Cited in the file of this patent

UNITED STATES PATENTS

| Number | Name | Date |
|---|---|---|
| 1,439,066 | Chandler et al. | Dec. 19, 1922 |
| 1,917,053 | Nelson et al. | July 4, 1933 |
| 2,358,688 | Cleland et al. | Sept. 19, 1944 |
| 2,362,220 | Shoemaker | Nov. 7, 1944 |
| 2,418,299 | Gorsuch | Apr. 1, 1947 |
| 2,426,889 | Le Tourneau | Sept. 2, 1947 |
| 2,515,833 | Mueller | July 18, 1950 |